United States Patent
Girimaji et al.

(10) Patent No.: US 10,197,661 B1
(45) Date of Patent: Feb. 5, 2019

(54) INFRASTRUCTURE ENABLED SMART DUAL-MODE TAGS

(71) Applicant: Cisco Technology, Inc., San Jose, CA (US)

(72) Inventors: Jagdish Girimaji, Pleasanton, CA (US); Santosh Ghanshyam Pandey, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/885,912

(22) Filed: Feb. 1, 2018

(51) Int. Cl.
| | |
|---|---|
| H04W 24/00 | (2009.01) |
| G01S 1/06 | (2006.01) |
| H04W 64/00 | (2009.01) |
| G01S 1/72 | (2006.01) |
| G01S 1/70 | (2006.01) |
| H04B 17/318 | (2015.01) |

(52) U.S. Cl.
CPC ........ *G01S 1/06* (2013.01); *G01S 1/70* (2013.01); *G01S 1/72* (2013.01); *H04B 17/318* (2015.01); *H04W 64/00* (2013.01)

(58) Field of Classification Search
CPC ..... G01S 1/06; G01S 1/70; G01S 1/72; H04B 17/318; H04W 64/00; H04W 4/80
See application file for complete search history.

(56) References Cited

U.S. PATENT DOCUMENTS

| | | | |
|---|---|---|---|
| 9,338,606 B2 | 5/2016 | Moshfeghi | |
| 9,341,700 B2 | 5/2016 | Amir et al. | |
| 2008/0061967 A1* | 3/2008 | Corrado | G06K 7/10079 340/539.26 |
| 2008/0151692 A1 | 6/2008 | Dijk et al. | |
| 2011/0195701 A1 | 8/2011 | Cook et al. | |
| 2016/0183317 A1* | 6/2016 | Shao | H04W 76/023 709/227 |
| 2016/0238690 A1 | 8/2016 | Colucci et al. | |

OTHER PUBLICATIONS

Holm, Sverre, Hybrid Ultrasound-RFID Indoor Positioning: Combining the Best of Both Worlds, 2009 IEEE International Conference on RFID, 8 pages, 2009, IEEE.
Lazik, et al., "ALPS: A Bluetooth and Ultrasound Platform for Mapping and Localization", SenSys'15, Nov. 1-4, 2015, 12 pages, 2015, ACM.
Medina, et al., "Ultrasound Indoor Positioning System Based on a Low-Power Wireless Sensor Network Providing Sub-Centimeter Accuracy", Sensors 2013, http://www.mdpi.com/journal/sensors, 26 pages, 2013, MDPI.
"Getting the User's Location", https://developer.apple.com/library/content/documentation/UserExperience/Conceptual/LocationAwarenessPG/CoreLocation/CoreLocation.html#//apple_ref/doc/uid/TP40009497-CH2-SW1, 5 pages, Mar. 21, 2016, Apple Inc.
"Region Monitoring and iBeacon", https://developer.apple.com/library/content/documentation/UserExperience/Conceptual/LocationAwarenessPG/RegionMonitoring/RegionMonitoring.html, 5 pages, Mar. 21, 2016, Apple Inc.

* cited by examiner

*Primary Examiner* — Barry W Taylor
(74) *Attorney, Agent, or Firm* — Parker Ibrahim & Berg LLP; James M. Behmke; Stephen D. LeBarron

(57) ABSTRACT

In one embodiment, a device in a network receives a radio frequency (RF) beacon. The device determines a received signal strength indication (RSSI) of the received RF beacon. The device compares the determined RSSI to an RSSI threshold. The device sends a burst of ultrasound or infrared beacons when the determined RSSI of the RF beacon exceeds the RSSI threshold. The burst of ultrasound or infrared beacons is then used by a location service in the network to determine a physical location of the device.

18 Claims, 10 Drawing Sheets

INFRASTRUCTURE ENABLED SMART DUAL-MODE TAGS

TECHNICAL FIELD

The present disclosure relates generally to computer networks, and, more particularly, to infrastructure enabled smart dual-mode tags.

BACKGROUND

In general, location services refer to a collection of network technologies that seek to determine, and potentially track, the physical location(s) of a device via a computer network. For example, mobile phone tracking is one example of location services that typically uses the triangulation of signals received from a phone by multiple cell towers to determine the physical location of the phone. This location information can be used for multiple purposes, such as forwarding the location to an emergency responder, for purposes of navigation, and the like.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
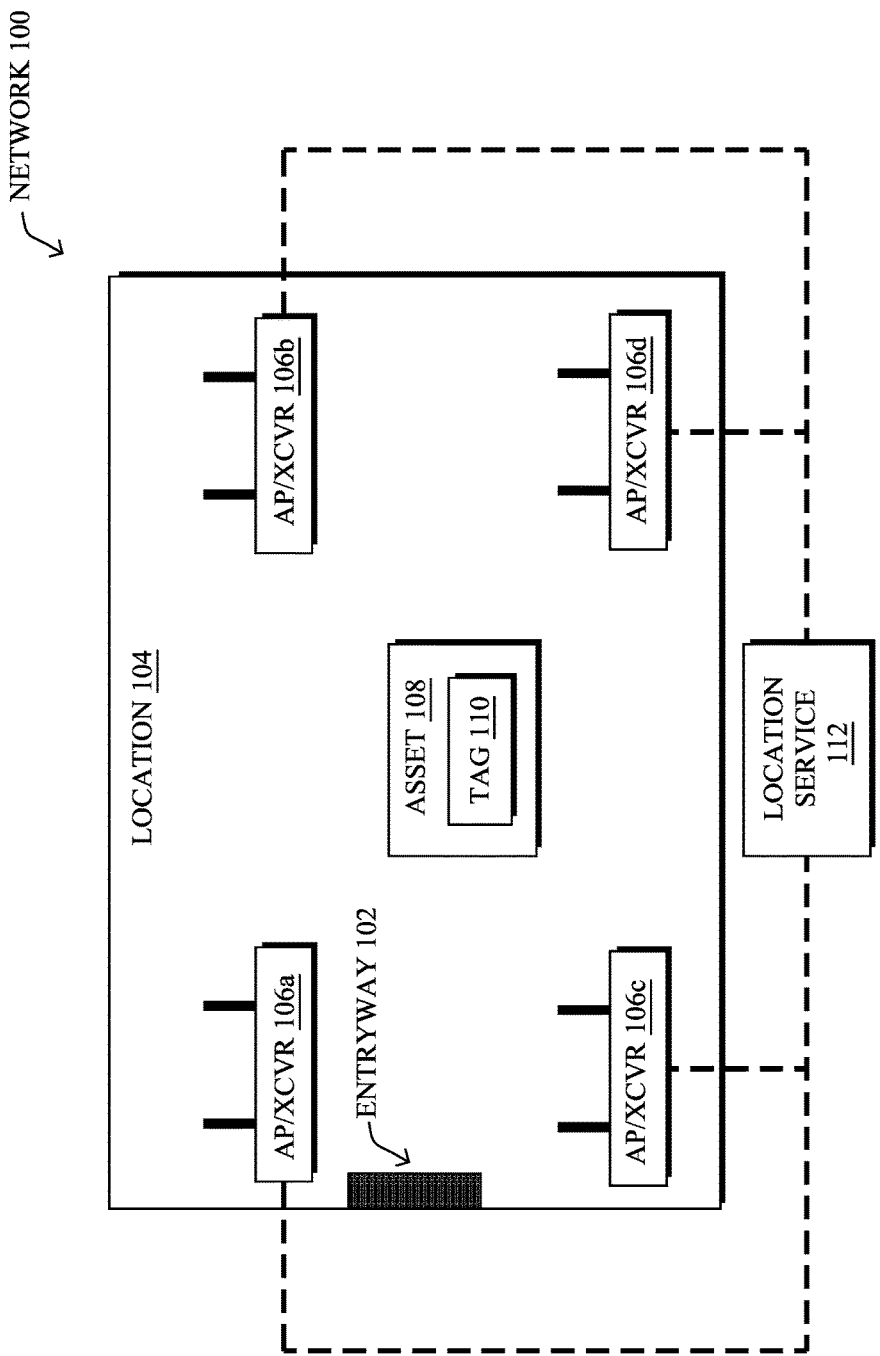
FIG. 1 illustrates an example communication network.

According to one or more embodiments of the disclosure, a device in a network receives a radio frequency (RF) beacon. The device determines a received signal strength indication (RSSI) of the received RF beacon. The device compares the determined RSSI to an RSSI threshold. The device sends a burst of ultrasound or infrared beacons when the determined RSSI of the RF beacon exceeds the RSSI threshold. The burst of ultrasound or infrared beacons is then used by a location service in the network to determine a physical location of the device.

In further embodiments, a location service in a network receives an indication sent by a device via radio frequency (RF) of the device having sent a burst of ultrasound or infrared beacons to the network for use by the location service to determine a physical location of the device. The location service determines whether the indicated burst of beacons was received by the network. The location service adjusts a received signal strength indication (RSSI) threshold used by the device to trigger the sending of the burst of ultrasound or infrared beacons to the network, based in part on the service determining that the indicated burst of beacons was not received by the network. The location service sends a notification of the adjusted RSSI threshold to the device.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices, such as a locator tag 104 and various networking devices, as shown. For example, network 100 may comprise any number of wireless access points (APs)/transceivers (XCVRs) 106 that are distributed throughout a physical location 104, such as a room or collection of rooms, floor or set of floors, building, or the like. In various embodiments, network 100 may be configured to determine and track the physical location of locator tag 110 within location 104. For example, location 104 may be a room having one or more entryways 102 and network 100 may be configured to identify whether locator tag 110/asset 108 is located within the room at any given point in time.

In some implementations, locator tag 110 may be a separate electronic device that may be affixed or otherwise attached to an asset 108 that is to be located and tracked via network 100. As would be appreciated, asset 108 may be any form of electronic or non-electronic object that is to be located within location 104. For example, asset 108 may be a component, piece of industrial equipment, or finished product in an industrial setting. In another example, asset 108 may be a piece of medical equipment, drug, or the like, in a medical setting.

In further implementations, the functionalities described herein with respect to locator tag 110 may be integrated into asset 108, if asset 108 is an electronic device with the capacity to perform these functions. For example, a laptop computer, mobile phone or other mobile device, or the like, may already have existing hardware to support the functions described herein with respect to locator tag 110. In such cases, asset 108 may then implement these functions through the use of specialized software downloaded to the device.

During operation, tag 110 may communicate with one or more of APs/XCVRs 106 (e.g., any or all of APs 106*a*-106*d* in location 104). Based on these communications, a location service 112 in network 100 may determine the physical location of tag 110 and, consequently, the location of asset 108, allowing asset 108 to be located and tracked within location 104. In general, such a locating mechanism may be may be taking into account any or all of the following:

Which of APs 106 received one or more transmissions from locator tag 110.

The signal strength of the received transmission(s).

The prior location(s) of locator tag 110/asset 108.

Distance, for example, between a given AP 106 and tag 110 may be a function of the signal strength of the transmission from tag 110. Similarly, if the transmission is received by multiple APs 106, triangulation or another location estimation technique can be used by location service 112 to correlate the transmissions and determine a physical location of tag 110/asset 108 within location 104.

In various embodiments, APs 106 may comprise one or more wireless transmitters or transceivers, to send location beacons to, and/or receive from, locator tag 110/asset 108. Examples of such beacons may include, but are not limited to, any or all of the following:

Radio Frequency (RF) beacons such as:
Wi-Fi beacons
Bluetooth Low Energy (BLE)
Ultrasound beacons
Infrared (IR) beacons For simplicity, APs 106 are show and described herein as supporting multiple types of beacons and communication technologies. However, in further embodiments, these may be implemented across multiple devices. For example, network 100 may comprise any number of ultrasound receivers, IR receivers, and/or RF receivers that may or may not be part of APs 106, in some embodiments.

Figure 2:
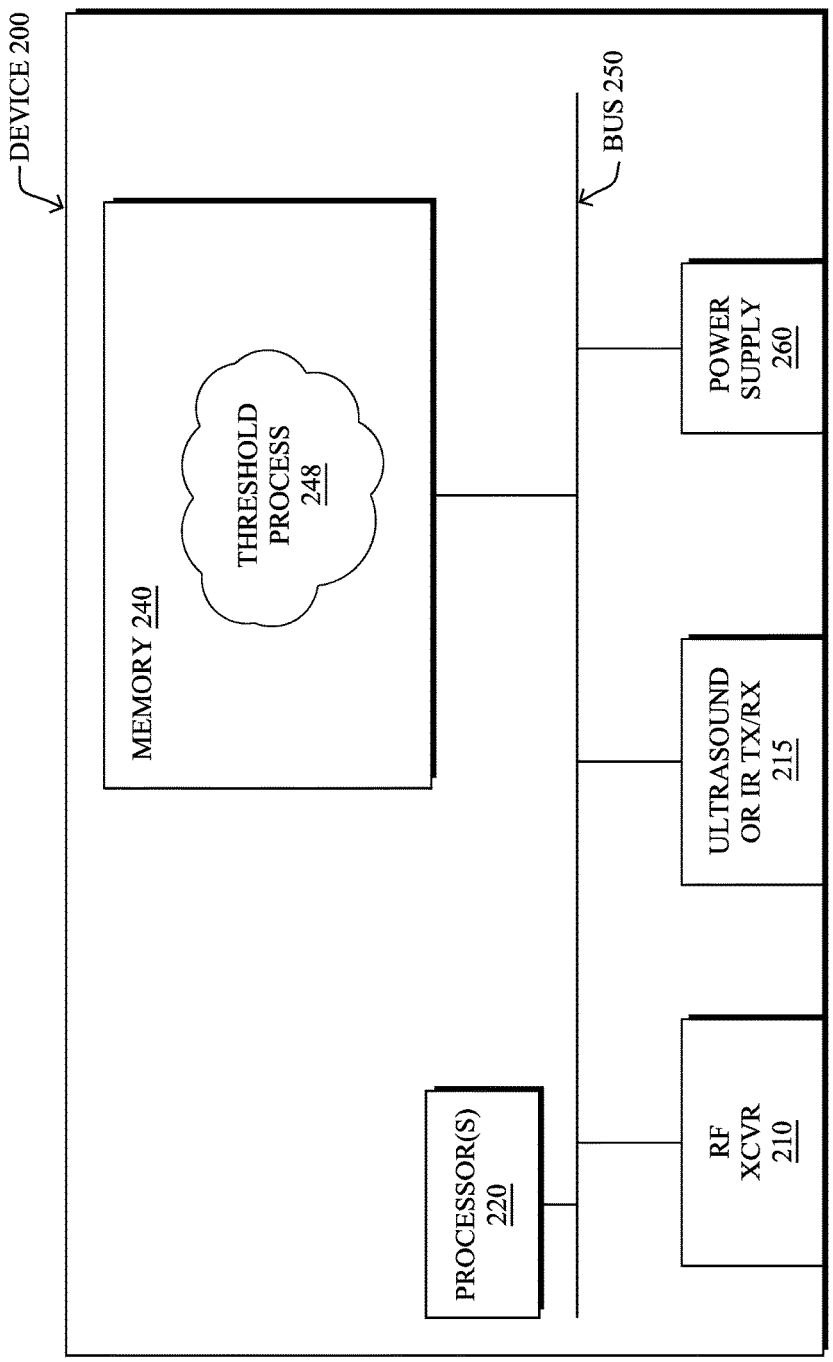
FIG. 2 illustrates an example network device/node.

FIG. 2 is a schematic block diagram of an example node/device 200 that may be used with one or more embodiments described herein, e.g., as any of the computing devices shown in FIG. 1, particularly tag 110, AP 106, location service 112, any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more interfaces 210/215, one or more processors 220, and a memory 240 interconnected by a system bus 250, and is powered by a power supply 260 (e.g., a hardwired power supply, a battery or other charge storage mechanism, etc.).

As shown, device 200 may include at least one RF transceiver (XCVR) 210 configured to receive and/or transmit RF-based communications, such as Wi-Fi, Bluetooth (e.g., BLE, etc.), or the like. In addition, in various embodiments, device 200 may also include an ultrasound or IR transmitter and/or receiver 215, thereby allowing for dual-mode operation of device 200.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures. In some cases, an operating system, portions of which are typically resident in memory 240 and executed by the processor(s) 220, functionally organizes the node/device by, inter alia, invoking network operations in support of software processors and/or services executing on the device. These software processors and/or services may comprise a threshold process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, a given device 200, such as tag 108, may support at least a dual mode of operation, whereby the device 200 leverages different wireless technologies for purposes of location services. For example, a given dual-mode tag may support both Bluetooth and ultrasound, thereby allowing for room-level location accuracy.

By way of a real-word example, in a typical ultrasound deployment, an ultrasound transmitter is embedded in the tag and ultrasound receivers are placed in the desired rooms. The ultrasound transmitter in the tag is always on and, when the tag enters a room with an ultrasound receiver, the receiver reports to the location service that the tag was heard, allowing the location service to determine the physical location of the tag with a reasonable degree of accuracy. Note also that ultrasound does not travel across walls and other obstacles, which can be a good choice for room level detection. However, technologies such as ultrasound, IR, etc. that provide for greater location accuracy (e.g., room level accuracy) also tend to consume battery charge at a high rate.

Infrastructure Enabled Smart Dual-Mode Tags

The techniques herein introduce a mechanism that opportunistically enables and disables the ultrasound or IR transmitter of a tag or other device, to reduce the battery consumption of the tag, while still supporting room level location accuracy. In some aspects, the received signal strength of an RF signal received by the tag or other device may be compared to a threshold, to determine whether to send the ultrasound or IR beacons, to provide better network location accuracy.

Specifically, according to one or more embodiments of the disclosure as described in detail below, a device in a network receives a radio frequency (RF) beacon. The device determines a received signal strength indication (RSSI) of the received RF beacon. The device compares the determined RSSI to an RSSI threshold. The device sends a burst of ultrasound or infrared beacons when the determined RSSI of the RF beacon exceeds the RSSI threshold. The burst of ultrasound or infrared beacons is then used by a location service in the network to determine a physical location of the device.

Illustratively, the techniques described herein may be performed by hardware, software, and/or firmware, such as in accordance with the threshold process 248, which may include computer executable instructions executed by the processor 220 (or independent processor of interfaces 210) to perform functions relating to the techniques described herein.

Operationally, certain technologies such as ultrasound or IR provide for better in-room location accuracy than others. However, as noted, these technologies also tend to consume a lot of power, which can be quite detrimental to mobile tags or devices that are battery powered. In various embodiments, an opportunistic mechanism is disclosed herein that only enables the sending of beacons using these technologies if the tag or other device receives an RF signal above a received signal strength indicator (RSSI) threshold.

Figure 3A:
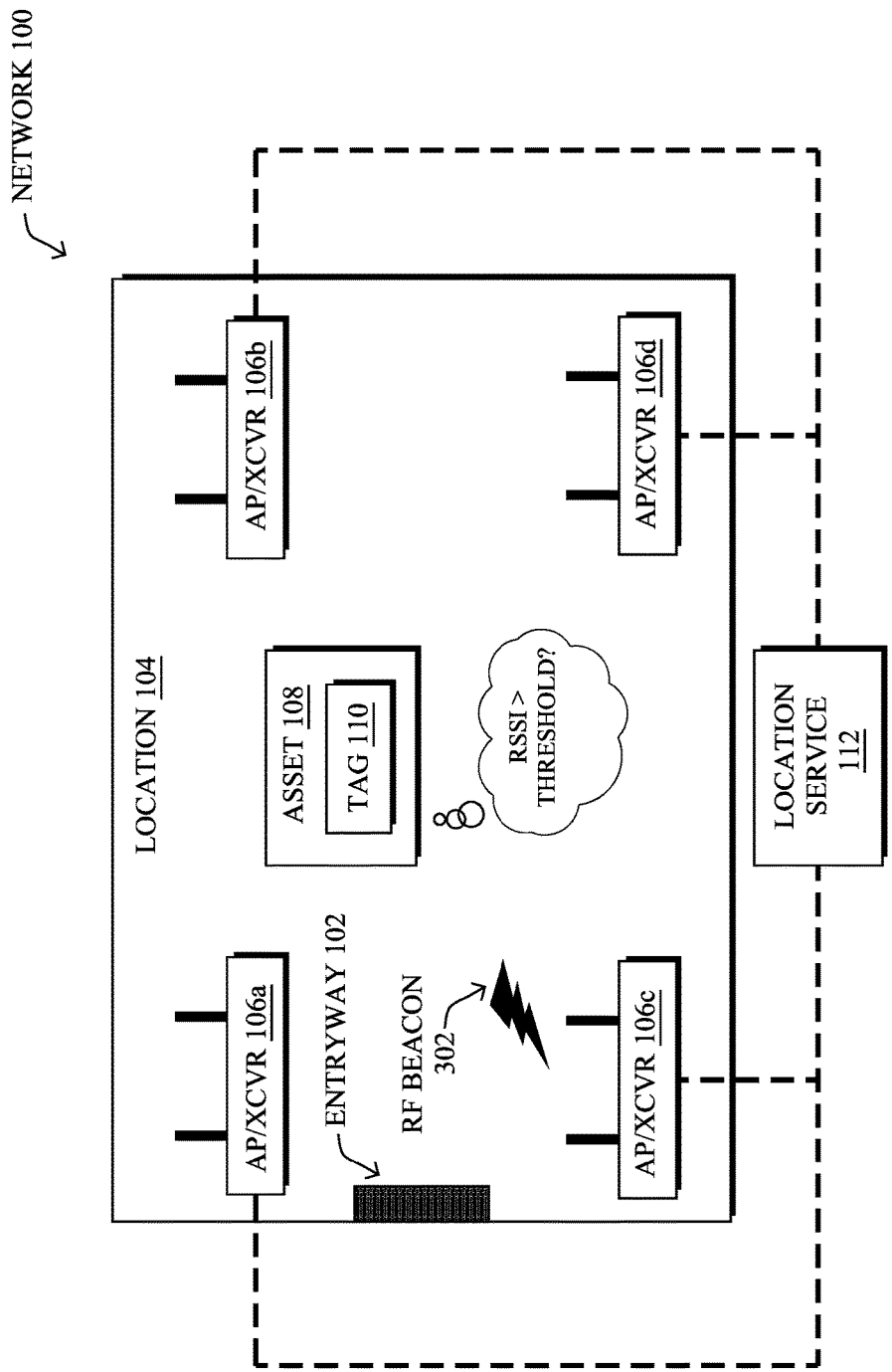
FIGS. 3A-3C illustrate an example of a device sending location beacons based on the signal strength of a received radio frequency (RF) beacon.
Figure 3B:
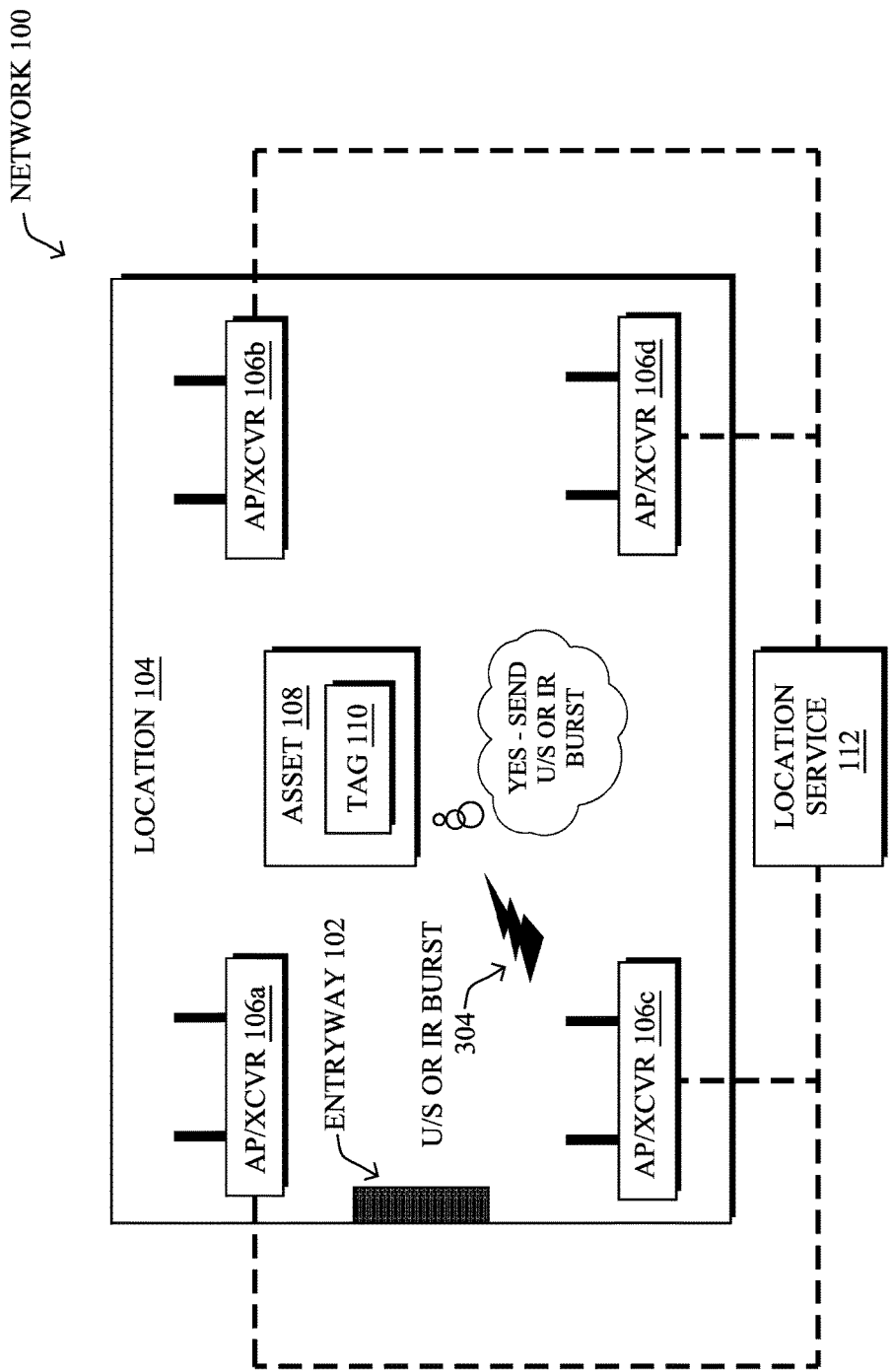
Figure 3C:
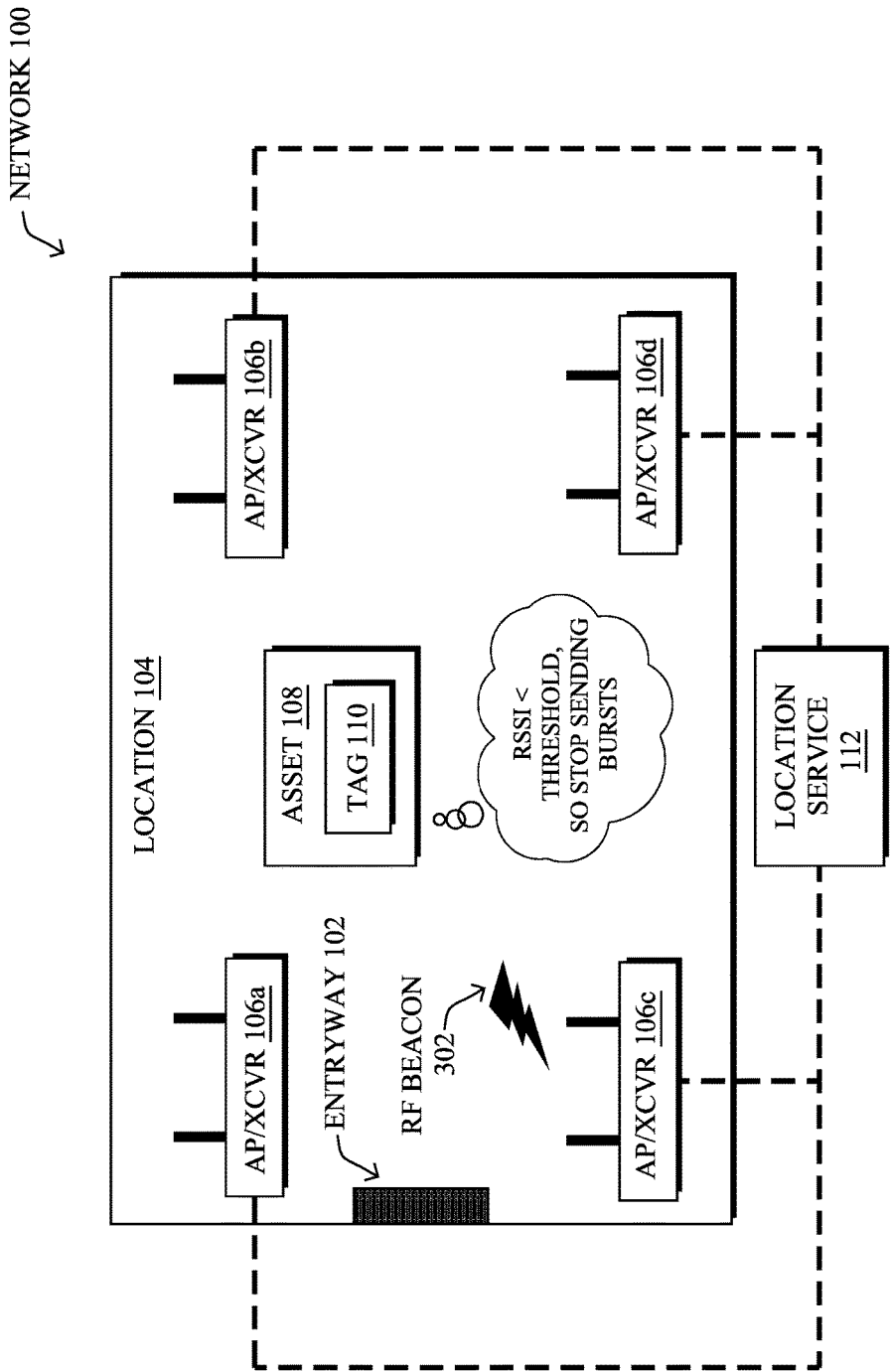

FIGS. 3A-3C illustrate an example of a device sending location beacons based on the signal strength of a received radio frequency (RF) beacon, according to various embodiments. Continuing the example of FIG. 1, assume in FIG. 3A that one or more of APs 106 send out an RF beacon 302. In one embodiment, RF beacon 302 maybe a Bluetooth-based beacon, such as a BLE beacon. However, in further embodiments, RF beacon 302 may be a Wi-Fi or other wireless protocol (e.g., LoRa, etc.) beacon that is sent by an AP or other transceiver 106.

During standard operation, the ultrasound or IR transmitter of locator tag 110 may be placed in an "off" or "disabled" state, so as not to consume power from the power supply of tag 110, in various embodiments. In further embodiments, if locator tag 110 receives RF beacon 302, it may compare the RSSI of RF beacon 302 to an RSSI threshold maintained by locator tag 110. If the RSSI of RF beacon 302 is less than that of the threshold, locator tag 110 may continue to keep its ultrasound or IR transmitter in its "off" or "disabled" state.

As shown in FIG. 3B, assume that locator tag 110 determines that the RSSI of RF beacon 302 is above the RSSI threshold maintained by tag 110 (e.g., X dBm). In such a case, in various embodiments, locator tag 110 may enable its ultrasound or IR transmitter and, in turn, send an ultrasound (U/S) or IR transmission that includes the ID of tag 110. For example, if ultrasound is used, locator tag 110 may send a burst 304 of consecutive ultrasound beacons (e.g., three, etc.) every predefined window (e.g., every 5 seconds, etc.). A similar approach may be taken, if locator tag 110 uses IR for room-level location accuracy.

When an AP 106 receives at least a portion of burst 304 from locator tag 110, the AP may indicate this reception to location service 112. Since ultrasound and IR are typically short range and potentially line of sight forms of communication, they provide a good mechanism for room-level location services. For example, if AP 106c received the burst 304 of ultrasound or IR transmissions from locator tag 110, location service 112 may determine that locator tag 110 (and asset 108) is located within the same room as that of AP 106c.

In various embodiments, locator tag 110 may continue to periodically send ultrasound or IR beacons, based on the RSSI of RF beacons that locator tag 110 receives from one or more of APs 106. For example, so long as the strongest Bluetooth or other RF beacon RSSI received by locator tag 110 has not changed more than a given threshold (e.g., 3 dB, etc.), locator tag 110 may continue to send bursts 304, potentially at a reduced periodicity after the initial burst (e.g., every twenty minutes, etc.). However, if the strongest signal of an RF beacon 302 received from one of APs 106 drops below the configured RSSI threshold of locator tag 110, locator tag 110 may stop sending bursts and return its ultrasound or IR transmitter to its "off" or "disabled" state, to conserve power. For example, as shown in FIG. 3C, if locator tag 110 has moved away from AP 106c and is no longer within proximity of any AP 106 sufficient to result in locator tag 110 receiving an RF beacon 302 above the threshold RSSI, locator tag 110 may stop sending ultrasound or IR bursts. This extends the battery life of locator tag 110 as the ultrasound or IR transmitter of tag 110 is only intelligently activated for purposes of locating the tag.

A further aspect of the techniques herein entails learning and configuring the appropriate RSSI threshold for a given locator tag or other device being tracked by a network. Notably, as the techniques herein leverage an RSSI threshold, which is typically represented as X dBm, there are some practical constraints on how the optimal value for X can be determined. These constrains include, for example:

The value of X may be a function of the specific deployment for the locator tag or other device. For example, the reception signal strength may be affected by furniture and other objects or obstructions present in a given deployment.

Even within a given deployment, X can also vary from room to room, as the rooms may vary in size (e.g., a larger room may require a lower X than that of a smaller room).

Thus, by configuring the RSSI threshold used by the device/locator tag to be dynamic, the sending of ultrasound or IR beacons by the device/tag, and associated energy savings, can also be optimized.

Figure 4A:
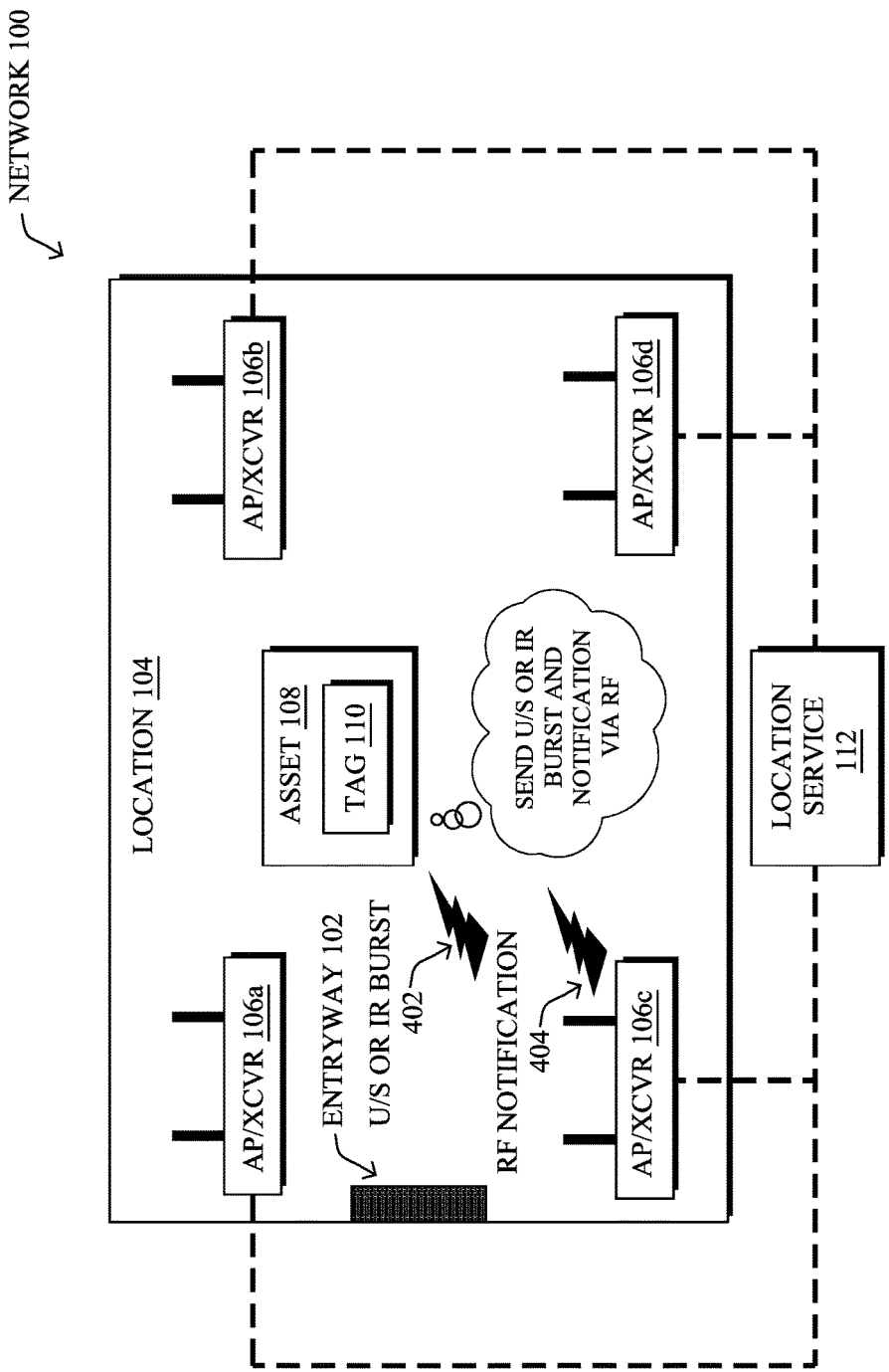
FIGS. 4A-4C illustrate an example of the adjustment of a signal strength threshold of a device.
Figure 4B:
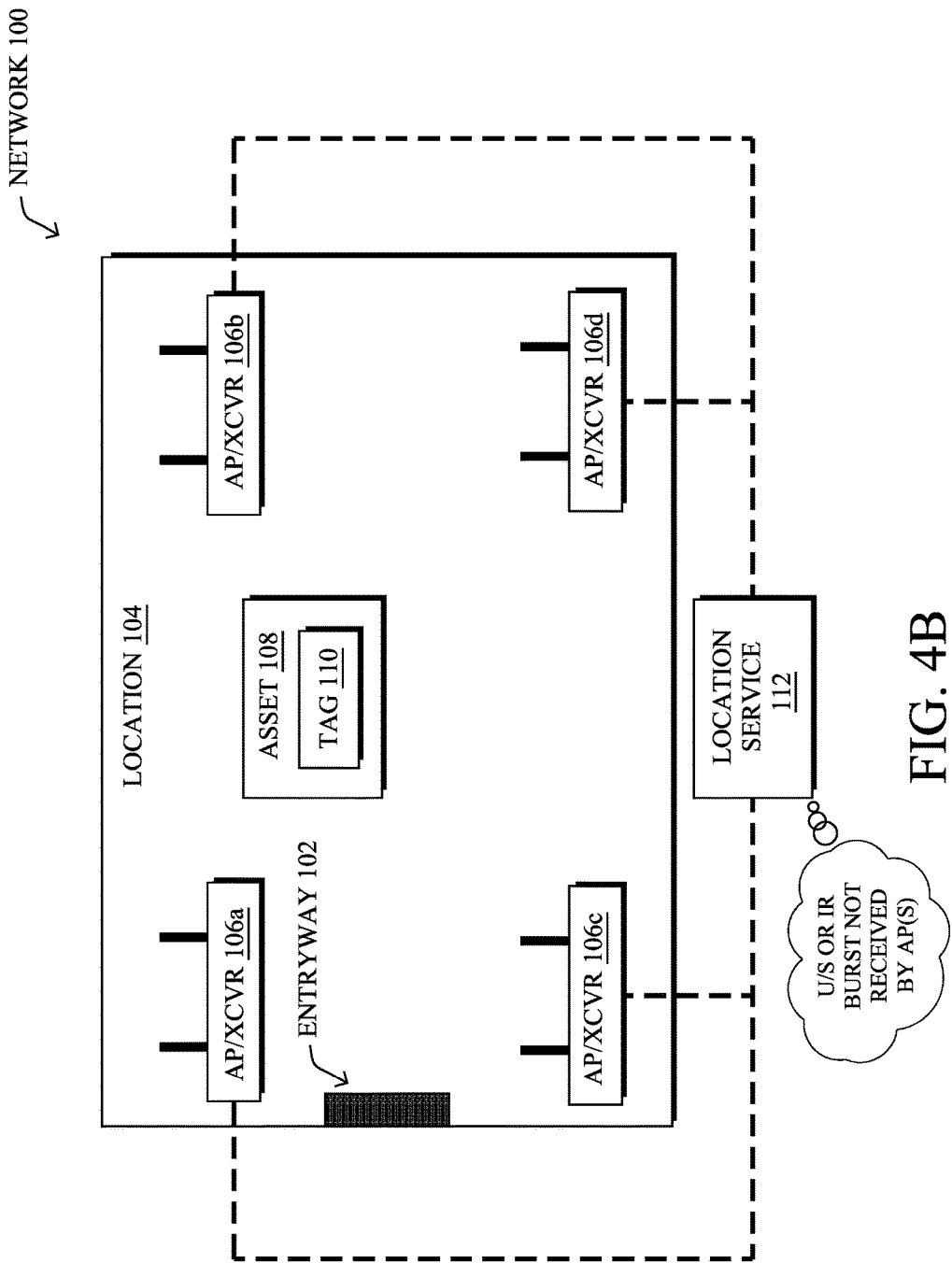
Figure 4C:
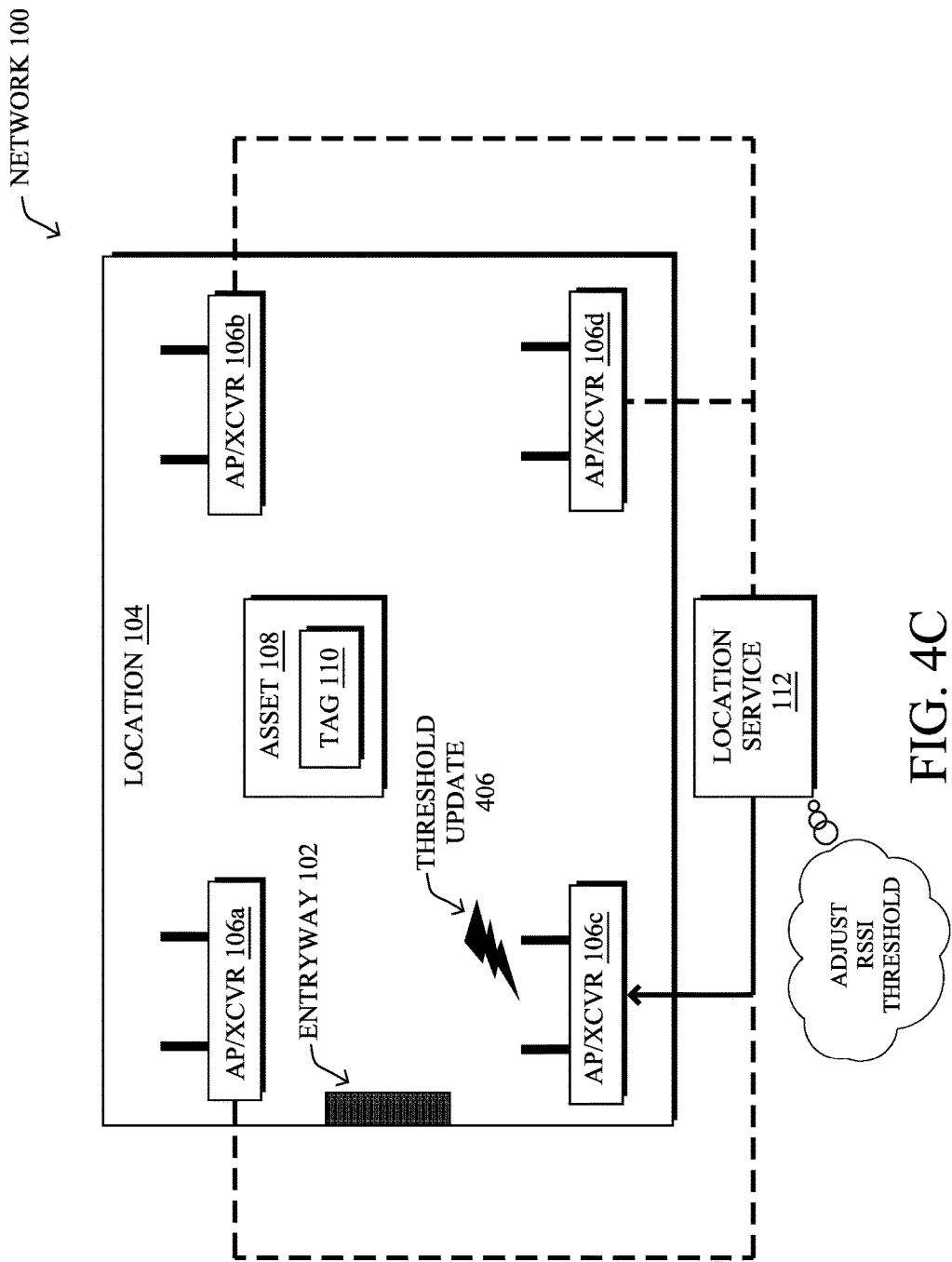

FIGS. 4A-4C illustrates an example of the adjustment of a signal strength threshold of a device, according to various embodiments. From an optimization standpoint, the ideal RSSI threshold for locator tag 110 (or other device) may be one that ensures that the tag is within range for its ultrasound or IR beacons to be received by the network without requiring retransmission. In other words, if the RSSI threshold is too low, there is the possibility of locator tag 110 sending a burst of ultrasound or IR beacons that are not actually received, thereby needlessly consuming battery power. Conversely, if the RSSI threshold is too high, locator tag 110 may only send a burst of ultrasound or IR beacons when very close to one of APs 106, thereby creating gaps in location 104 where the tag does not send the beacons, and reducing the ability of location service 112 to locate tag 110.

As shown in FIG. 4A, assume that locator tag 110 begins with an RSSI threshold of X dBm for all RF beacons (e.g., Bluetooth/BLE, Wi-Fi, etc.) received from APs 106. When locator tag 110 receives an RF beacon from a given AP 106 that exceeds this threshold, it may send a burst 402 of ultrasound or IR beacons, in the manner described previously. In addition, in some embodiments, locator tag 110 may also send an RF-based notification 404 (e.g., Bluetooth/BLE, Wi-Fi, etc.) to indicate that locator tag 110 sent burst 402 of ultrasound or IR beacons. Notification 404 may include, for example, the radio ID of the AP 106 (e.g., MAC, UUID/Major/Minor ID, etc.) that triggered locator tag 110 to send burst 402, as well as the RSSI of the triggering RF beacon received from that AP by locator tag 110. When received, the AP 106 can then forward this notification on to location service 112 for further analysis.

As would be appreciated, RF-based notification 404 is likely to have a higher chance of reception by an AP 106 than that of ultrasound or IR burst 402, as the latter forms of communication are typically very limited and/or line-of-sight. Thus, as shown in FIG. 4B, location service 112 can use the information from RF-based notification 404 to determine whether the indicated burst of ultrasound or IR beacons was also received by network 100. In turn, in various embodiments, location service 112 may adjust the RSSI threshold used by locator tag 110, based on this determination. For example, if an AP 106 received RF-based notification 404, but did not receive ultrasound or IR burst 402, this may indicate that the RSSI threshold used by locator tag 110 is too low and should be increased. After determining the new RSSI threshold, location service 112 may cause one or more of APs 106 to send the threshold update 106 to locator tag 110, to change the threshold used by the tag.

In some cases, location service 112 may consider the reception, or lack thereof, of ultrasound or IR beacons by a plurality of tags/devices over the course of time, to determine an appropriate RSSI threshold for a tag/device. For example, location service 112 may crowdsource information from a plurality of tags/devices, to determine whether the set of tags at a given RRSI threshold of X dBm are unable to reliably send a burst of ultrasound or IR beacons to any receiver in a given room. If so, location service 112 may determine that their RSSI thresholds should be increased, meaning that the tags/devices need to be closer to APs 106 before triggering the burst. Conversely, in some embodiments, if a tag/device has already been identified as being in a given room (e.g., by sending a burst of ultrasound or IR beacons), location service 112 may determine that the RSSI threshold of the tag/device should be lowered, to avoid the sending of too many bursts.

By iteratively adjusting the RSSI threshold of a given tag/device, this process will eventually stabilize, leading to an optimized threshold for the deployment. Note also that for non-room APs, such as APs in the open space on ceilings, the RSSI threshold can be an invalid value like 0, to prevent unnecessary triggering of ultrasound or IR bursts by the tags/devices.

In some embodiments, location service 112 may use machine learning, to determine the optimal RSSI threshold for a locator tag or other device. In general, machine learning is concerned with the design and the development of techniques that receive empirical data as input (e.g., data regarding whether a burst of ultrasound or IR beacons were received by the network, RSSI values, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M = a*x + b*y + c$ and the cost function is a function of the number of misclassified points. The learning process then operates by adjusting the parameters a,b,c such that the number of misclassified points is minimal. After this optimization/learning phase, location service 112 can use the model M to classify new data points, such as information regarding new tags or other devices in the network. Often, M is a statistical model, and the cost function is inversely proportional to the likelihood of M, given the input data.

In various embodiments, location service 112 may employ one or more supervised, unsupervised, or semi-supervised machine learning models. Generally, supervised learning entails the use of a training set of data, as noted above, that is used to train the model to apply labels to the input data. For example, the training data may include sample RSSI thresholds that result in either "burst reception" or "burst loss." On the other end of the spectrum are unsupervised techniques that do not require a training set of labels. Notably, while a supervised learning model may look for previously seen patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that can be used to determine and adjust the RSSI threshold of a locator tag or other device may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

In some deployments, very large rooms may have multiple APs placed along the walls. In this case, the above RF notification sent by the locator tag/device may identify a plurality of APs whose RSSIs exceeded the threshold(s) of the tag/device. In this case, location service 112 may send a single RSSI threshold for the collection of APs or, alternatively, individual RSSI thresholds for each of the APs. Doing so can help prevent one AP triggering the sending of an ultrasound or IR burst, followed by another AP in the room triggering another burst.

Without the techniques herein, the ultrasound or IR transmitter of a locator tag/device has to always be active and transmitting at a high periodicity. However, using the techniques herein, it may only transmit when it is highly useful to determine the room level accuracy. The energy savings are dependent on whether the tag/device is always in a room or moves in and out of the room. Since the tags/device out of the room would most likely not hear the RF beacons from an AP strongly at all the time (note that they may still, on occasion), this would completely save transmission power when the tags/devices are out of the room.

Assume, for example, that a given locator tag is located in a room 50% of the time and is outside of the room 50% of the time. Further, assume that room-level detection with high confidence would require ultrasound beacons to be sent every five seconds. Thus, over the course of an hour, this would lead to 720 transmissions without the techniques herein. However, using the techniques herein, the number of bursts will drop to zero outside of the room (e.g., between t=0 and t=30 mins). Once the tag enters the room (e.g., at t=30 mins), it may send a single burst of ultrasound beacons (e.g., three beacons), followed by a single transmission twenty minutes later, resulting in a total of four transmissions over the same hour. Hence, the power savings in this case would be (720−4)/720*100=99%.

Figure 5:
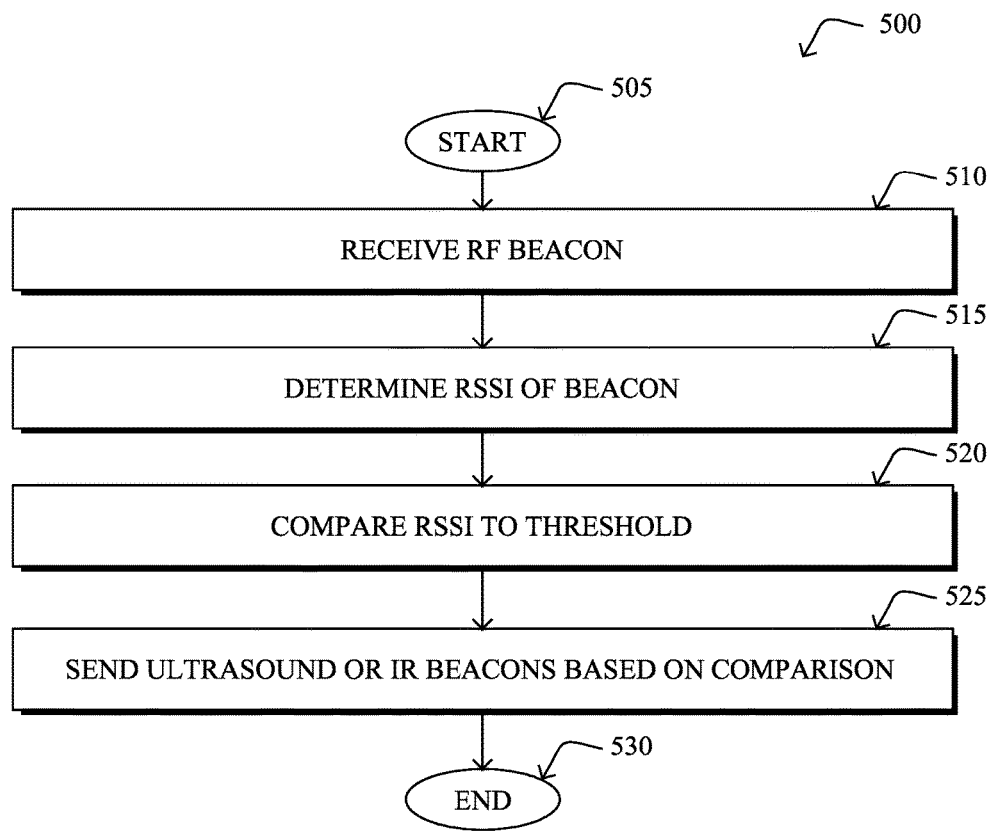
FIG. 5 illustrates an example simplified procedure for sending beacons based on the signal strength of a received beacon.

FIG. 5 illustrates an example simplified procedure for sending beacons based on the signal strength of a received beacon in a network, in accordance with one or more embodiments described herein. For example, a non-generic, specifically configured device (e.g., device 200), such as a locator tag, may perform procedure 500 by executing stored instructions (e.g., process 248). The procedure 500 may start at step 505, and continues to step 510, where, as described in greater detail above, the device may receive an RF-based beacon, such as from an AP or other transmitter in the network. For example, such a beacon may be a BLE or Wi-Fi beacon.

At step 515, as detailed above, the device may determine a received signal strength indication (RSSI) of the received RF beacon. For example, the device may determine the dBm at which the beacon was received from the AP or other transmitter in the network.

At step 520, the device may compare the determined RSSI to an RSSI threshold, as described in greater detail above. In various embodiments, such a threshold may be maintained by the device and can be set by default and/or be adjusted dynamically by the network. Generally, the threshold may control whether or not the device activates a room-level or other fine granularity location mechanism, such as an IR or ultrasound transmitter of the device.

At step 525, as detailed above, the device may send a burst of ultrasound or infrared beacons when the determined RSSI of the RF beacon exceeds the RSSI threshold. In turn, the burst of ultrasound or infrared beacons may be used by a location service in the network to determine a physical location of the device. In some embodiments, the device may also send an RF-based notification in conjunction with the burst, so as to notify the network of the sent burst of ultrasound or IR beacons. Procedure 500 then ends at step 530.

Figure 6:
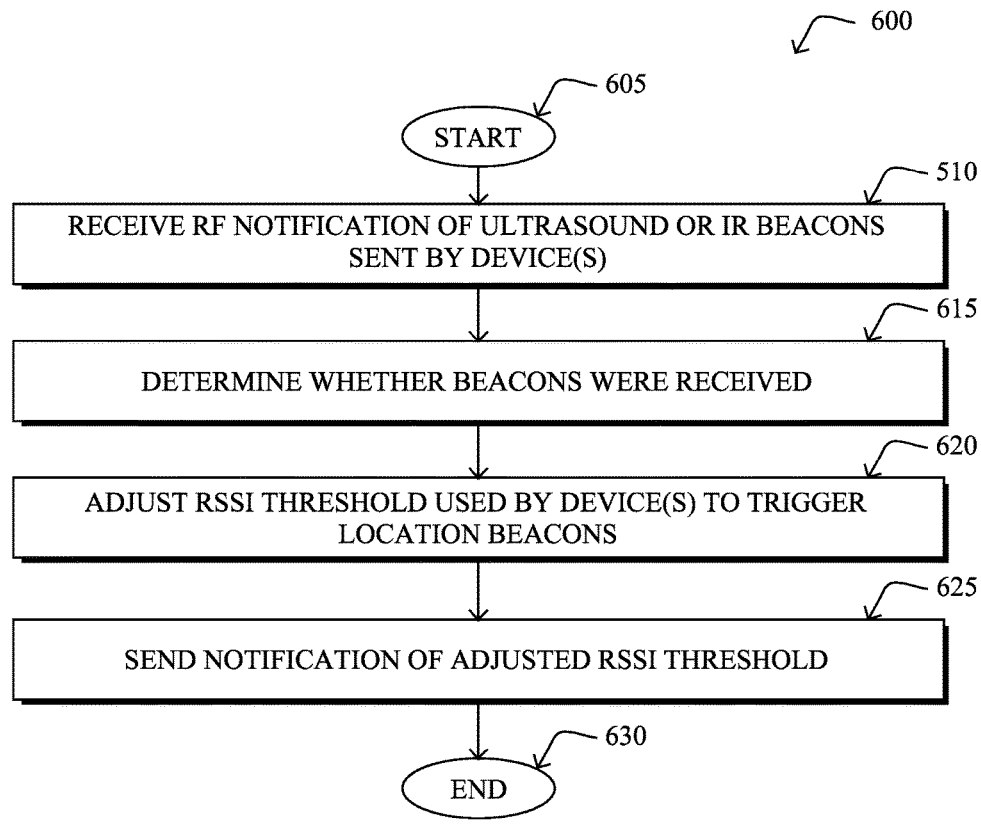
FIG. 6 illustrates an example simplified procedure for adjusting a signal strength threshold used to trigger the sending of location beacons.

FIG. 6 illustrates an example simplified procedure for adjusting a signal strength threshold used to trigger the sending of location beacons in a network, in accordance with one or more embodiments described herein. For example, a non-generic, specifically configured device acting as a location service may perform procedure 600 by executing stored instructions. The procedure 600 may start at step 605, and continues to step 610, where, as described in greater detail above, the location service may receives an indication sent by a device via radio frequency (RF) of the device having sent a burst of ultrasound or infrared beacons to the network for use by the location service to determine a physical location of the device. For example, in addition to sending a burst of ultrasound or IR beacons, the device may also send a BLE, Wi-Fi, etc. notification to the network that identifies the burst of beacons and potentially information about why the burst was triggered (e.g., the AP that triggered the burst, RSSI information, etc.).

At step 615, as detailed above, the location service may determine whether the indicated burst of beacons was received by the network. Notably, based on the information in the notification from step 610, the location service may determine whether the AP(s) also received the indicated burst of ultrasound or IR beacons from the device.

At step 620, the location service may adjust a received signal strength indication (RSSI) threshold used by the device to trigger the sending of the burst of ultrasound or infrared beacons to the network, as described in greater detail above. In various embodiments, the location service may do so based in part on the service determining that the indicated burst of beacons was not received by the network. For example, if the device indicated that it sent a burst of ultrasound or IR beacons, but these were not received by the network, this may indicate that the triggering RSSI threshold used by the device is too low and that the device needs to be closer to an AP before sending such a burst. In further embodiments, the location service may use machine learning and/or leverage a pool of information across any number of tags/devices, to determine the adjusted RSSI threshold.

At step 625, as detailed above, the location service may send a notification of the adjusted RSSI threshold to the device. For example, the location service may send the adjusted RSSI threshold to the AP that received the notification of step 610 which, in turn, sends the adjusted RSSI threshold to the device for future use. Procedure 600 then ends at step 630.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide a power saving mechanism for dual or multimode locator tags or devices by ensuring that the tag/device only sends ultrasound or IR beacons when within a certain range of the intended AP or other receiver of the network.

While there have been shown and described illustrative embodiments that provide for smart dual-mode tags in a network, it is to be understood that various other adaptations and modifications may be made within the spirit and scope of the embodiments herein. For example, while certain embodiments are described herein with respect to using certain protocols, such as BLE, Wi-Fi, etc., other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method comprising:
receiving, at a device in a network, a radio frequency (RF) beacon;
determining, by the device, a received signal strength indication (RSSI) of the received RF beacon;
comparing, by the device, the determined RSSI to an RSSI threshold;

sending, by the device, a burst of ultrasound or infrared beacons when the determined RSSI of the RF beacon exceeds the RSSI threshold, wherein the burst of ultrasound or infrared beacons is used by a location service in the network to determine a physical location of the device;

sending, by the device, an RF notification to the network indicative of the burst of ultrasound or infrared beacons, wherein the location service determines an adjusted RSSI threshold for the device based in part on whether the indicated burst of beacons were actually received by the network; and receiving, at the device, the adjusted RSSI threshold from the location service.

2. The method as in claim 1, wherein the received RF beacon is a Bluetooth Low Energy (BLE) beacon.

3. The method as in claim 1, wherein the received RF beacon is a Wi-Fi beacon.

4. The method as in claim 1, further comprising:
preventing, by the device, the ultrasound or infrared beacons from being sent by the device based the device determining that an RSSI of a second RF beacon received by the device is below the RSSI threshold.

5. The method as in claim 1, wherein the device is a locator tag attached to a tracked asset.

6. The method as in claim 1, wherein the device sends a burst of ultrasound beacons.

7. The method as in claim 1, wherein the device sends a burst of infrared beacons.

8. A method comprising:
receiving, at a location service in a network, an indication sent by a device via radio frequency (RF) of the device having sent a burst of ultrasound or infrared beacons to the network for use by the location service to determine a physical location of the device;

determining, by the location service, whether the indicated burst of beacons was received by the network;

adjusting, by the location service, a received signal strength indication (RSSI) threshold used by the device to trigger the sending of the burst of ultrasound or infrared beacons to the network, based in part on the service determining that the indicated burst of beacons was not received by the network; and sending, by the location service, a notification of the adjusted RSSI threshold to the device.

9. The method as in claim 8, wherein the received indication of the burst of beacons was sent by the device via Bluetooth Low Energy (BLE).

10. The method as in claim 8, wherein the received indication of the burst of beacons was sent by the device via Wi-Fi.

11. The method as in claim 8, wherein adjusting the RSSI threshold used by the device to trigger the sending of the burst of ultrasound or infrared beacons to the network comprises:
increasing the RSSI threshold used by the device.

12. An apparatus, comprising:
one or more network interfaces to communicate with a network;
a processor coupled to the network interfaces and configured to execute one or more processes; and
a memory configured to store a process executable by the processor, the process when executed configured to:
receive radio frequency (RF) beacon;
determine received signal strength indication (RSSI) of the received RF beacon;
compare the determined RSSI to an RSSI threshold;
send a burst of ultrasound or infrared beacons when the determined RSSI of the RF beacon exceeds the RSSI threshold, wherein the burst of ultrasound or infrared beacons is used by a location service in the network to determine a physical location of the device;
send an RF notification to the network indicative of the burst of ultrasound or infrared beacons, wherein the location service determines an adjusted RSSI threshold for the device based in part on whether the indicated burst of beacons were actually received by the network; and
receive the adjusted RSSI threshold from the location service.

13. The apparatus as in claim 12, wherein the received RF beacon is a Bluetooth Low Energy (BLE) beacon.

14. The apparatus as in claim 12, wherein the received RF beacon is a Wi-Fi beacon.

15. The apparatus as in claim 12, wherein the process when executed is further configured to:
prevent the ultrasound or infrared beacons from being sent by the device based the device determining that an RSSI of a second RF beacon received by the device is below the RSSI threshold.

16. The apparatus as in claim 12, wherein the device is a locator tag attached to a tracked asset.

17. The apparatus as in claim 12, wherein the device sends a burst of ultrasound beacons.

18. The apparatus as in claim 12, wherein the device sends a burst of infrared beacons.

* * * * *